United States Patent Office 3,444,095
Patented May 13, 1969

3,444,095
OXIDATION CATALYST CONTAINING A LEAD COMPOUND AND CARBONACEOUS MATERIAL
Charles L. Thomas, Swarthmore, Pa., assignor to Sun Oil Company, Philadelphia, Pa., a corporation of New Jersey
No Drawing. Filed Sept. 20, 1966, Ser. No. 580,580
Int. Cl. B01j *11/78*
U.S. Cl. 252—441                                    6 Claims

ABSTRACT OF THE DISCLOSURE

This invention relates to the oxidation of aromatic compounds by a novel catalytic method. More particularly, the invention relates to the oxidation of aromatic compounds with oxygen in the conjoint presence of certain lead compounds and carbonaceous matter.

Background of the invention

Various methods have been proposed from time to time for the oxidation of aromatic compounds, but for varying reasons in each instance, these have met only limited success. They have either suffered in terms of conversion and/or yields, difficulty in separation of products because of the number and/or types of byproducts. Some have involved toxic or otherwise hazardous reactants or products. Frequently, these processes have been relatively expensive despite their shortcomings.

It is an object of this invention to provide a catalytic process wherein the catalyst is comprised of plentiful and inexpensive materials. It is a further object to provide a catalyst which is easy to prepare. It is a further object of this invention to provide a highly effective catalytic oxidation process to prepare various oxidation products. It is still a further object of this invention to provide a vapor phase catalytic oxidation process attendant with all the advantages of a vapor phase process. It is yet another object to provide an oxidation process having some degree of flexibility in product.

Description of the invention

It has now been found that certain lead compounds and carbonaceous matter coact to provide a novel and highly advantageous catalyzed oxidation procedure. To be more specific, it has been found that an aromatic hydrocarbon can be readily oxidized in the conjoint presence of a heterogenous catalyst comprising a lead compound selected from the group consisting of lead oxide, lead chloride, lead bromide, lead oxychloride, lead oxybromide or lead chloride-bromide and carbonaceous matter when passed in the vapor state together with a molecular oxygen containing gas over said catalyst at elevated temperatures.

Before proceeding with specific detailed examples, it will be found advantageous to first discuss certain features of the invention and their relationship.

The lead compounds that are to be employed will not require extensive discusion, but will be adequately discussed herein after the discussion of the carbonaceous material. The carbonaceous material will require further discussion to properly understand same, and particularly the full range of materials that are suitable here. Obviously, the term includes substantially pure elemental carbon matter, such as carbon black, or lamp black in particular, but it also includes other material as well. For example, the various grades of coke, including electrode grade coke, but it need not be of that high qualtiy, as it may be alternatively petroleum coke or pitch coke, or be a mixture of carbonaceous material mentioned herein. It can be anthracite retort carbon, soft coal or natural graphite, any of the active forms of carbon, such as charcoal and chars of wood, vegetable, bone and blook, and the like carbonaceous materials.

The lead compounds may be prepared in any of the well known fashions. They, like the carbonaceous matter, can be employed in many various forms. For example, the catalyst can comprise a mixture of granules or pellets of the lead compound and the carbonaceous material. On the other hand, it may be a fluidized mixture of the powders, using conventional and well-recognized procedures. Still another form is an impregnated carbonaceous body wherein the lead compound impregnation is effected on the carbonaceous matter by a solution of same.

Generally, the lead compound and the carbonaceous material is used in a ratio by weight of 1:1 to 20:1. Preferably, the ratio is 3:1 to 10:1 on the same basis.

The catalyst is quite flexible with regard to the products that may be prepared using same. In amplification of this, it is pointed out that the product may be an intermediate oxidiation product, such as an aldehyde, ketone, phenolic or alcohol, or a fully oxidized product, such as a carboxylic acid. Of course, in this oxidation reaction, as with all others in the prior art, unless extreme measures are taken, there is a mixture of products of the reaction in the various oxidation states. However, one product will predominate substantially at a particular set of conditions, and the predominating compound can be changed by a change in conditions. With this in mind, the specific ranges of operating conditions will now be set forth and discussed.

In the preparation of alcohols, phenols and the like, a temperature of 300° to 400° C. is generally suitable; however, in most cases a temperature in the range of 320° to 350° C. will be preferred. In the preparation of aldehydes a temperature generally in the range of 300° to 380° C. will be found suitable to that end; however, temperatures in the range of 300° to 335° C. will be usually found advantageous and preferred. Where the product desired is the fully-oxidized carboxylic acid, instead of the alcohols or aldehydes, a temperature in the general range of 340° to 400° C. will be found most usually suitable to that end. In most cases of preparing the acid, a temperature in the range of 340° to 360° C. will be found advantageous and preferred. In connection with the temperature, it is desired to point out that the reaction is exothermic, and accordingly, cooling means will normally be highly desirable, if not in fact required. Inert diluents may be used, if desired, to control residence time and/or temperature.

It is, of course, immediately recognized by those skilled in the art that contact or residence time with the catalyst bed is very important to a determination of the product or product distribution, in addition to temperature. It will be immediately appreciated that the length of contact time and the extent of oxidation vary directly. Other than to point out that contact times on the order of 0.1 second to 1 minute will generally be found to be suitable and advantageous, further discussion of this feature is not necessary, and accordingly, will be dispensed with.

As to the pressures that may be employed, usually atmospheric pressure is preferred, but superatmospheric and subatmospheric will not only be found acceptable, but preferred in some cases, since pressure is a valuable process variable for controlling time of contact with the catalyst.

The aromatics which may be oxidized are generally those same ones oxidized by the prior art process, for example, benzene; toluene; ethyl benzene; 1,2,4,5- and the other tetramethyl benzenes; octyl benzene, eicosyl benzene; xylenes; diethyl benzenes; methyl propyl benzenes; ethyl hexyl benzenes; dihexyl benzenes; butyl dodecyl benzenes; methyl tetradecyl benzenes; didodecyl benzenes; ethyl eicosyl benzenes; dieicosyl benzenes. The important 1,4- disubstituted compounds of the foregoing are definitely suitable. Other examples are naphthalene; methyl naphthalenes; ethyl naphthalene; eicosyl naphthalenes; dimethyl naphthalenes, such as 1,4-dimethyl naphthalene,
1-methyl-6-ethyl naphthalene,
2,6-dimethyl naphthalene,
1-methyl-5-hexyl naphthalene,
1-propyl-8-pentyl naphthalene,
2-ethyl-7-nonyl naphthalene,
2-butyl-6-decyl naphthalene,
2,6-dibutyl naphthalene,
2,7-dihexyl naphthalene,
2-pentyl-6-dodecyl naphthalene,
2,6-didodecyl naphthalene,
2-methyl-6-octadecyl naphthalene,
2,6-dieicosyl
and the like, and mixtures of the foregoing.

The preferred molecular oxygen containing gas is air. The next most preferred is a stream of elemental oxygen. Generally speaking, a stoichiometric amount of oxygen is employed commensurate with the number of oxygenated group or groups sought, plus the hydrogen oxidized to water. In most cases, however, an excess of hydrocarbon is to be preferred and adjusted outside the explosive limits of the particular mixture.

Having now discussed the invention in broad and general terms and certain features with varying degrees of particularity, it is believed that any further discussion of the invention will be more beneficial in conjugation with detailed working examples. It is to be understood that the examples found hereinbelow are merely illustrative and are not limiting, the same being offered merely to facilitate the understanding of the present invention. It is to be further understood, of course, that all the reaction variables are more or less interdependent and, accordingly, when one variable is arbitrarily fixed, the limits within which others may be varied are somewhat restricted. The more desirable ranges for ordinary applications of my invention are indicated herein, and these can also be ascertained from the specific illustrative examples presented herein. However, for any particular application of my invention, the most desirable conditions can be readily determined by routine trial by one skilled in the art, such a determination being facilitated by the discussion of a relationship and trends of the variables presented herein and in the examples.

Example

A catalyst, according to one embodiment of this invention, is prepared by forming ⅛" x ⅛" pellets from a well-comminuted mixture of 20 parts by weight of lamp black, and 78 parts by weight of lead oxychloride and 2 parts by weight of graphite as a die lubricant. The heterogenous cocatalyst pellets are charged to a reactor to provide a fixed bed of about 100 c.c.s. in volume. Benzene is vaporized and charged to the reactor co-mingled with air at a ratio of about 10:1 moles of benzene to oxygen. The rate of flow of benzene and oxygen containing gas is charged under sufficient positive pressure to provide for flow through the bed and at a rate to provide a residence time of about 2 seconds. The temperature of the catalyst bed in the reactor is maintained at a temperature of about 340° to 360° C. The crude products are cooled, and the principal and desired oxidation product phenol is then recovered from the mixture by conventional means. A smaller amount of maleic anhydride, which is also produced, is also recovered. Unreacted excess benzene is recycled to the reactor to increase the conversion and yields.

Having now described the invention, many ramifications and modified embodiments will readily occur to those skilled in the art. Insofar as such variations do not depart from the spirit and scope of the invention described in this application, they are intended to be embraced by the appended claims in their broadest construction.

The invention claimed is:

1. An oxidation catalyst comprising in combination a carbonaceous material consisting essentially of carbon and a member selected from the group consisting of lead oxide, lead oxychlirode, lead bromide, lead oxybromide nad lead chloride-bromide, the weight ratio of the lead compound and the carbonaceous material being about 1:1 to 20:1 respectively.

2. A catalyst according to claim 1 wherein said lead compound is lead oxide.

3. A catalyst according to claim 1 wherein said lead compound is lead oxychloride.

4. A catalyst according to claim 1 wherein said carbonaceous matter is carbon black.

5. A catalyst according to claim 1 wherein said carbonaceous matter is an activated carbon.

6. A catalyst according to claim 1 wherein said carbonaceous matter is coke.

References Cited

UNITED STATES PATENTS 2,919,266   11/1957   Lauer.
3,285,878   11/1966   Mackfozie.

PATRICK P. GARVIN, *Primary Examiner.*

U.S. Cl. X.R.

252—447; 260—533, 621